No. 819,187. PATENTED MAY 1, 1906.
O. P. VROOM.
HAY STACKER.
APPLICATION FILED SEPT. 11, 1905.
2 SHEETS—SHEET 1.
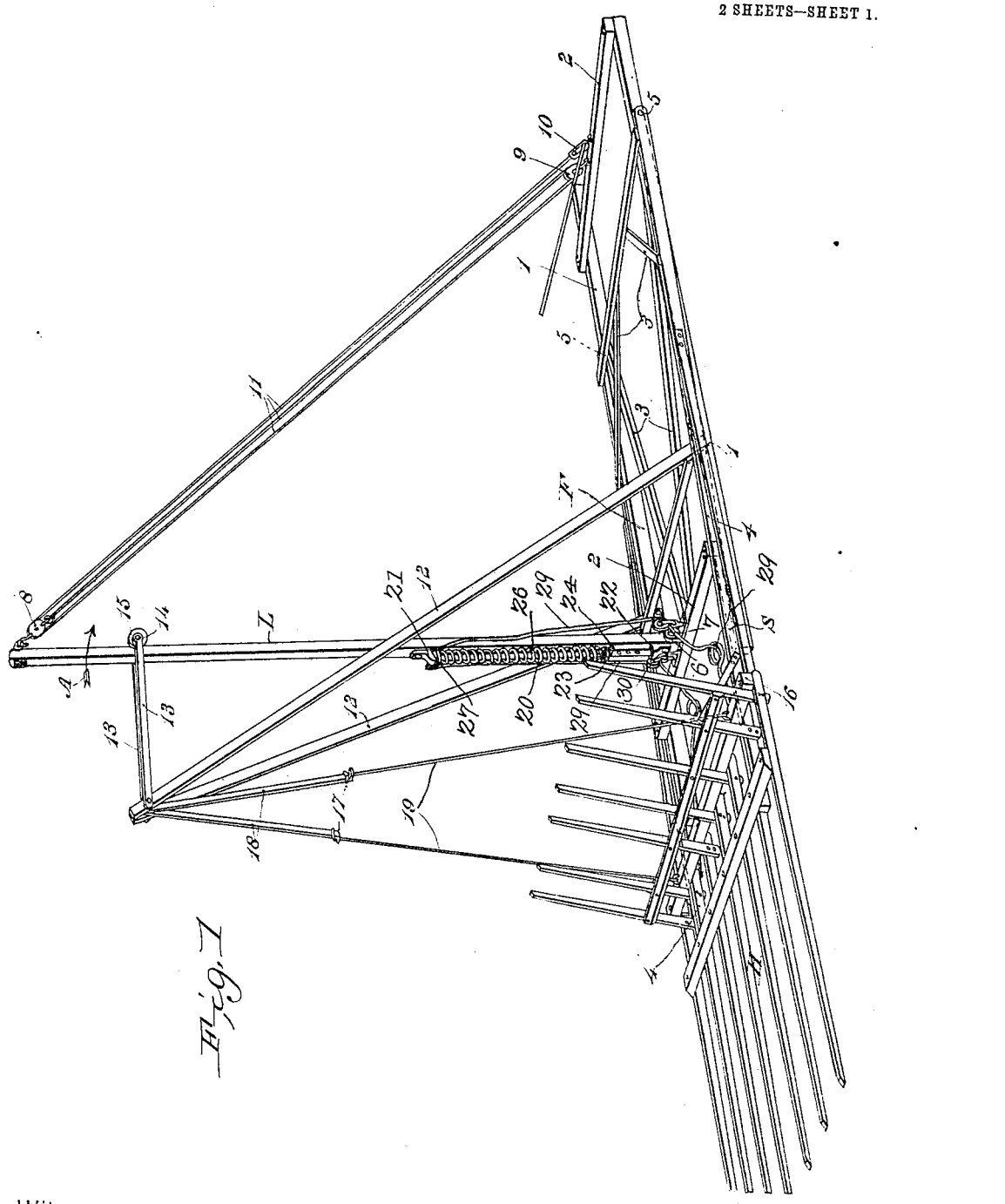
Witnesses
Oler P. Vroom, Inventor.
by C. A. Snow & Co.
Attorneys No. 819,187. PATENTED MAY 1, 1906.
O. P. VROOM.
HAY STACKER.
APPLICATION FILED SEPT. 11, 1905.
2 SHEETS—SHEET 2.
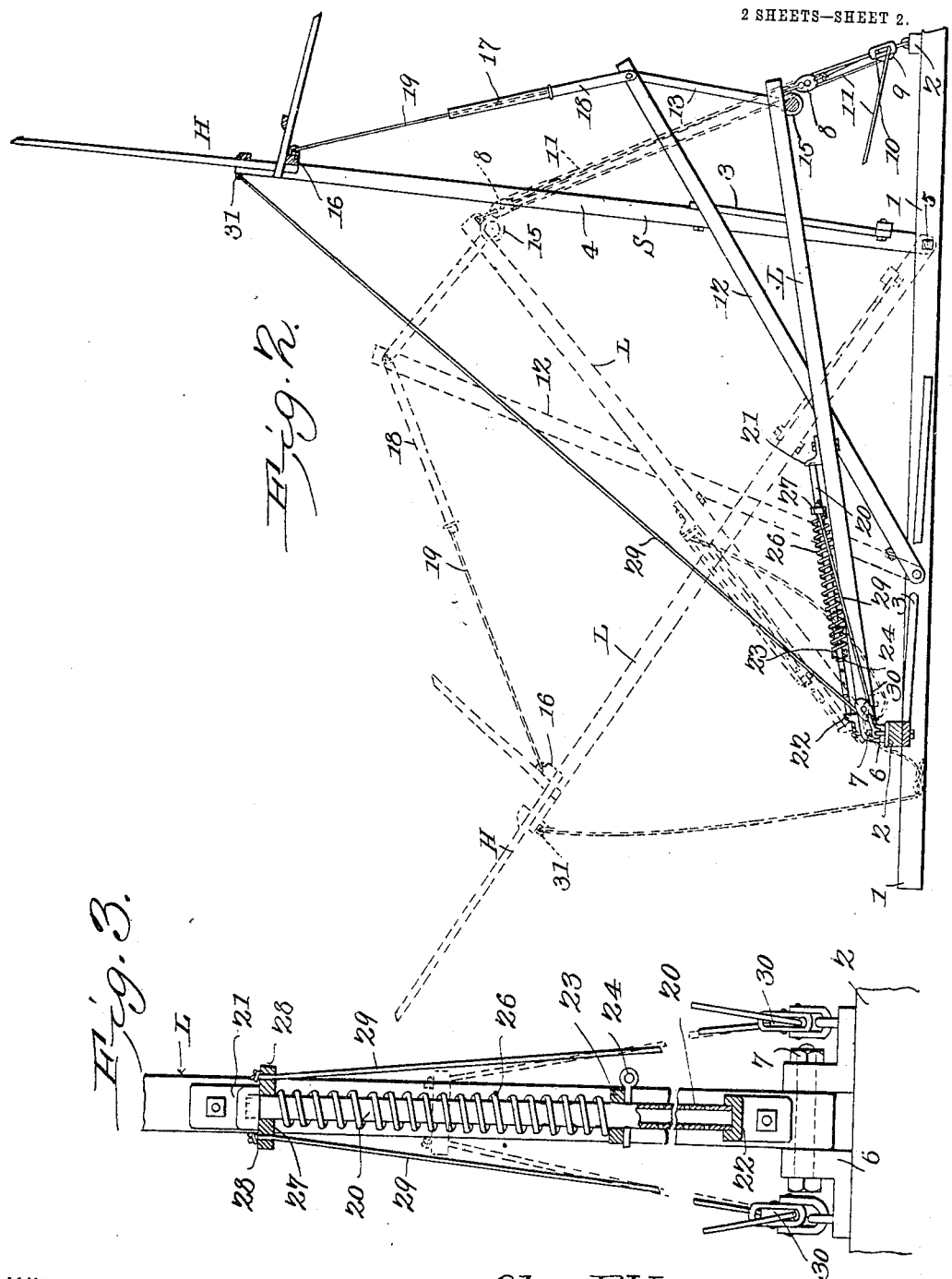
Witnesses
Oler P. Vroom, Inventor
by C.A.Snow & Co
Attorneys

UNITED STATES PATENT OFFICE.

OLER P. VROOM, OF LINNEUS, MISSOURI, ASSIGNOR TO THE SUPERIOR HAY STACKER MANUFACTURING COMPANY, OF LINNEUS, MISSOURI.

HAY-STACKER.

No. 819,187. Specification of Letters Patent. Patented May 1, 1906.

Application filed September 11, 1905. Serial No. 277,939.

*To all whom it may concern:*

Be it known that I, OLER P. VROOM, a citizen of the United States, residing at Linneus, in the county of Linn and State of Missouri, have invented a new and useful Hay-Stacker, of which the following is a specification.

This invention relates to that class of haystackers in which there are combined a baseframe forming a support, a stacker-frame pivotally connected with said base-frame, an operating-lever with the free end of which the hoisting-tackle is connected, and a vibratory frame which is operated by the lever and which is operatively connected with the stacker-frame.

The object of the present invention is to simplify and improve the general construction and operation of the device and to gain an increased leverage at the starting-point where the loaded stacker-frame begins to rise from the ground and where the greatest amount of power is required.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

In said drawings, Figure 1 is a perspective view of a hay-stacker constructed in accordance with the principles of the invention. Fig. 2 is a sectional elevation of the same, showing the stacker-frame in full lines in discharging position and in dotted lines in an intermediate position. Fig. 3 is a detail view of the spring for restoring the stackerframe and related parts.

Corresponding parts in the several figures are indicated throughout by similar characters of reference.

A preferably rectangular base-frame is provided, as F, said frame including side members 1 1 and cross members 2 2, whereby said side members are spaced and connected, as well as obliquely-disposed braces 3 3, whereby the structure is reinforced. The side members 1 1 may, when desired, constitute skids or runners upon which the device may be conveniently moved from one place to another.

The side members 4 4 of the stacker-frame S are pivotally connected with the outer sides of the side members 1 1 of the base-frame near the rear end of the latter, the pivotal pins 5 5 being in axial alinement, so that the stacker-frame may swing hingedly thereon. The stacker-frame is provided with the usual stacker-head H, which when the frame is lowered rests upon the ground in longitudinal alinement with the base-frame F, as will be clearly seen in Fig. 1 of the drawings.

One of the cross-bars 2 near the front end of the base-frame is provided with lugs 6, between which the operating-lever L is fulcrumed upon a pin 7. This lever, which normally extends upwardly from the base, is made of considerable length, and its free end is connected with the rear cross-piece 2 of the base-frame by means of tackle, including guide-pulleys 8, 9, and 10 and a flexible element 11, such as a rope or cable, the free end of which is extended to the point of attachment of the draft.

Pivotally connected with the side members of the base-frame are the side members of an inverted-V-shaped vibratory frame or hoisting-frame 12, provided near its apex with a pair of pivoted straps 13, extending adjacent to the sides of the lever L and connected by means of a pin 14, upon which is journaled a grooved pulley 15, riding upon the lever, which affords a track for said pulley. The apex of the frame 12 is also connected with a cross-bar 16 of the stacker-head by collapsible connecting means 17, composed of straps 18 and rods 19, slidably connected with each other, so as to be capable of collapsing when the distance between the apex of the frame 12 and the stacker-head is diminished, thus avoiding the difficulties frequantly encountered where flexible connecting means are used, it being of course understood that the straps 18 and the rods 19 are practically non-flexible.

A spring device is provided to assist in restoring the stacker-head from an elevated to a lowered position, said spring device including a rod 20, which for the sake of lightness may be tubular, such as an ordinary one-inch gas-pipe of suitable length, the ends of said rod or pipe being secured in socketed brackets 21 22, made fast to the lever L. Fitted adjustably upon the rod 20 is a collar 23, which may be retained in position by any suitable means, such as a cotter-pin 24, engaging one of a plurality of perforations in the rod. Coiled upon the latter above the collar 23 is a spring 26, which exercises its tension upwardly against a slide 27, fitted upon the upper end of the rod. The slide 27 has perforated lugs or ears 28 for the attachment of flexible elements, such as ropes 29, which are guided over suitably-disposed guide elements, such as pulleys 30 30, to the stacker-head H, with which the free ends of the ropes are connected, as by staples 31. It is obvious that when the stacker-head is elevated beyond a certain limit the spring will be compressed, so that when the draft exercised upon the stacker-frame is discontinued the expansive force of the spring will be utilized to restore the stacker-frame in the direction of its initial position.

From the foregoing description, taken in connection with the drawings hereto annexed, the operation and advantages of this invention will be readily understood by those skilled in the art to which it appertains. When the device is in its initial position, as shown in Fig. 1, the stacker-head rests upon the ground and the pulley 15, carried by the straps 13, is spaced quite a distance from the free end of the lever L, with which the tackle is connected. When a load has been placed upon the stacker-head and draft is applied to the tackle, the lever 7 will swing in the direction of the arrow A in Fig. 1, carrying with it the vibratory frame and the stacker-frame, the head of which is thus gradually elevated. As the movement continues the pulley 15 will gradually travel outwardly upon the lever L, thus gradually decreasing the leverage in proportion as the load is being raised, the greatest leverage being exerted at the starting-point, where it is most needed. Excessive strain upon the draft-animals will thus be avoided at the starting-point. When the stacker-frame reaches its discharging position, it swings slightly beyond the vertical plane, passing through the pivotal points of its side members; but at the same time the spring 26 will be compressed, the tension of the spring having previously been adjusted by properly adjusting the position of the collar 23, so that when the load is discharged the tension of the spring will be utilized to restore the device in the direction of its initial position.

Having thus described the invention, what is claimed is—

1. In a hay-stacker, an operating-lever, a pivoted hoisting-frame, and means connecting the apex of the hoisting-frame with the lever and movable upon the latter.

2. In a hay-stacker, an operating-lever, a pivoted hoisting-frame, straps connected with the apex of the latter, and a pulley supported by said straps and movably engaging the lever.

3. In a hay-stacker, a base-frame, a stacker-frame connected therewith, a pivoted hoisting-frame, collapsible connecting means between the hoisting-frame and the stacker-frame, an operating-lever, a pulley movable upon said lever, and straps connecting the axis of said pulley with the apex of the hoisting-frame.

4. In a hay-stacker, a pivoted stacker-frame, a pivoted hoisting-frame, and collapsible connecting means between said frames including slidably-connected rigid members.

5. In a hay-stacker, the combination with suitably-connected hoisting and stacker frames, of an operating-lever, and means connecting the hoisting-frame with the lever and movable upon the latter between its fulcrum and its free end to which power is applied.

6. In a hay-stacker, a base-frame, a stacker-frame connected therewith, a pivoted hoisting-frame, an operating-lever, a guide-rod connected with and spaced from said lever, a spring-actuated slide movable upon said guide-rod, and suitably-guided flexible members connected with said slide and with the head of the stacker-frame.

7. In a hay-stacker, a base-frame, a stacker-frame connected therewith, a pivoted hoisting-frame, collapsible connecting means between the hoisting-frame and the stacker-frame, an operating-lever, a guide-rod connected with and spaced from said lever, a collar adjustable upon the guide-rod, a slide movable upon the latter and having laterally-extending perforated ears, suitably-guided flexible elements connecting the slide with the head of the stacker-frame, and a spring coiled upon the guide-rod between the collar and the slide.

In testimony that I claim the foregoing as my own I have hereto affixed my signature in the presence of two witnesses.

OLER P. VROOM.

Witnesses:
   F. W. POWERS,
   J. A. NEAL.